United States Patent
Liao et al.

(10) Patent No.: US 9,241,104 B1
(45) Date of Patent: Jan. 19, 2016

(54) PANORAMA PHOTOGRAPHING METHOD

(71) Applicant: HTC Corporation, Taoyuan, Taoyuan County (TW)

(72) Inventors: Scott Chien-Hung Liao, Taoyuan (TW); Horng-Lin Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/528,413

(22) Filed: Oct. 30, 2014

(51) Int. Cl.
*H04N 5/232* (2006.01)

(52) U.S. Cl.
CPC ....... *H04N 5/23238* (2013.01); *H04N 5/23293* (2013.01)

(58) Field of Classification Search
CPC ............................. H04N 5/23238; G03B 27/00
USPC .......................................................... 396/335
See application file for complete search history.

(56) References Cited

U.S. PATENT DOCUMENTS

| | | | | |
|---|---|---|---|---|
| 2014/0139621 A1* | 5/2014 | Shinozaki | .......... | H04N 5/23238 348/36 |
| 2014/0192247 A1* | 7/2014 | Cheong | .................... | G06F 3/011 348/333.11 |
| 2014/0300693 A1* | 10/2014 | Hirata | ................ | H04N 5/23216 348/39 |

* cited by examiner

*Primary Examiner* — Clayton E Laballe
*Assistant Examiner* — Dennis Hancock
(74) *Attorney, Agent, or Firm* — Birch, Stewart, Kolasch & Birch, LLP

(57) ABSTRACT

A panorama photographing method is provided. Firstly, panorama focal positions required for a full panoramic image are defined. A designated shooting area is determined. The panorama focal positions within the designated shooting area are taken as plural designated focal positions. Then, plural target images corresponding to the plural designated focal positions are captured. A partial panoramic image corresponding to the designated shooting area is generated according to the plural target images.

19 Claims, 15 Drawing Sheets

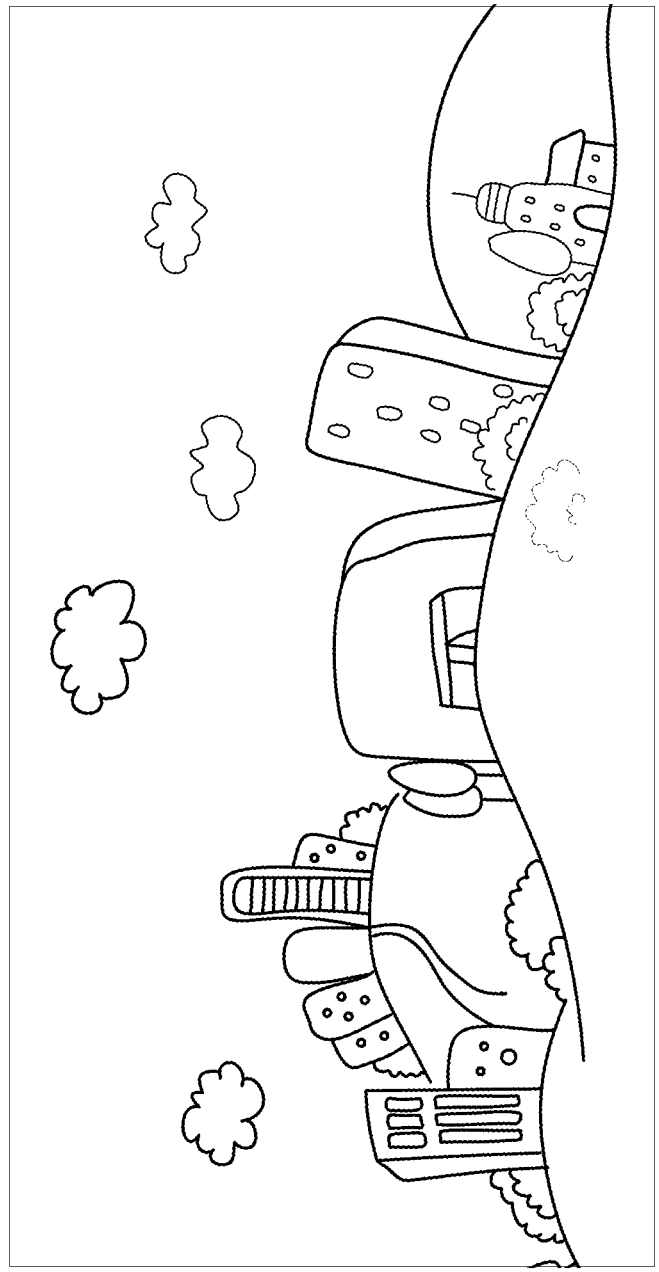

PANORAMA PHOTOGRAPHING METHOD

BACKGROUND

1. Technical Field

The disclosure relates in general to a photographing method, and more particularly to a panorama photographing method.

2. Description of the Related Art

For meeting the photographing demands of consumers, electronic devices such as mobile phone, digital camera or tablet computers are usually equipped with lenses and display panels for allowing the users to capture images. In comparison with the field of vision of the user, a shooting area of a the lens is relatively smaller. Due to the limitations of the shooting area of the lens, it is difficult to capture a wide-range image.

FIG. 1 schematically shows a capturing range of a conventional photographing device. In case that the user is in an outdoor environment, the field of vision ($R_{total}$) of the user has a width $W_{total}$ and a height $H_{total}$.

In this context, the range captured by the lens is also referred as a capturing range. As shown in FIG. 1, the capturing range $R_{unit}$ has a width $W_{unit}$ and a height $H_{unit}$. The width $W_{unit}$ and the height $H_{unit}$ of the capturing range $R_{unit}$ are much smaller than the width $W_{total}$ and the height $H_{total}$ of the field of vision, respectively.

Generally, by slightly changing the position of the user or changing the distance (that is, a focusing distance) between an actual focal position and the photographing device, the position and the size of the capturing range may be slightly changed. However, the approaches of adjusting the position and the size of the capturing range are restricted by the real environment. That is, the conventional way of adjusting the capturing range is limited.

SUMMARY

According to one embodiment, a panorama photographing method is provided. The panorama photographing method includes following steps. Firstly, plural panorama focal positions required for a full panorama image are defined. Then, a designated shooting area is determined, and the panorama focal positions within the designated shooting area are accordingly taken as plural designated focal positions. Plural target images corresponding to the plural designated focal positions are captured for generating a partial panorama image corresponding to the designated shooting area.

BRIEF DESCRIPTION OF THE DRAWINGS

FIG. 5 schematically shows the partial panoramic image obtained by stitching the raw images.

Figure 1:
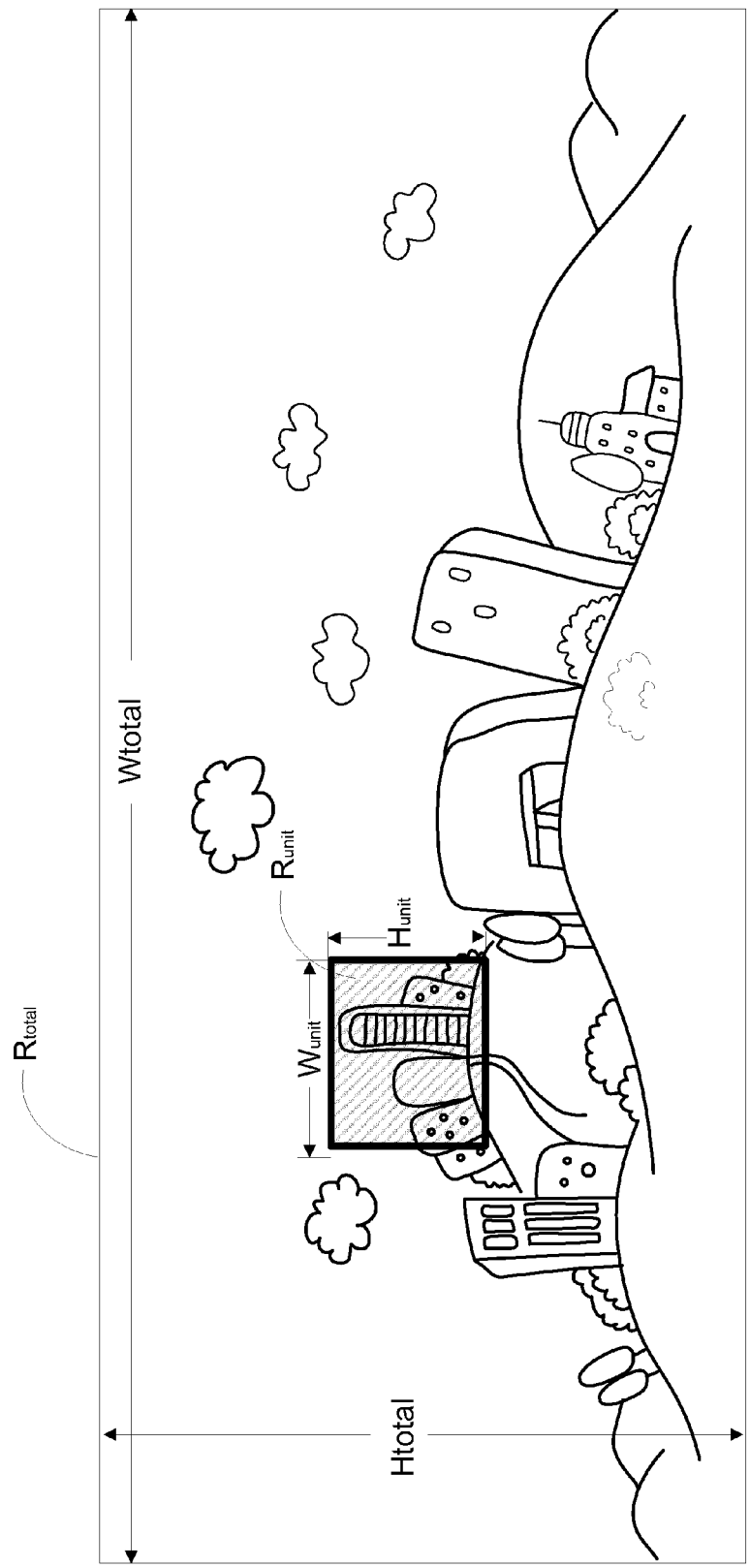
FIG. 1 (prior art) schematically shows a capturing range of a conventional photographing device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

As previously described, due to the limitations of the capturing range $R_{unit}$ of the photographing device, it is difficult to capture a wide-range image. The present disclosure provides a panorama photographing method for allowing the user to select a desired shooting area. In this context, the electronic device for implementing the panorama photographing method is also referred as a photographing device. By using the panorama photographing method, the photographing device can generate a partial panoramic image according to the user's needs.

By operating the photographing device of the present disclosure, the user may determine a designated shooting area $R_{select}$ and capture plural raw images corresponding to the designated shooting area $R_{select}$. After all of the raw images are stitched together according to a panorama algorithm, a partial panoramic image is generated. Generally, every two adjacent raw images have an overlapped region. The raw images are stitched together by referring to the overlapped regions. For clarification and brevity, the overlapped regions between adjacent raw images are not shown in the drawings. Similarly, the adjacent capturing ranges are also partially overlapped with each other. The approaches of stitching the raw images as the partial panoramic image are well known to those skilled in the art, and not redundantly described herein.

In accordance with the panorama photographing method of the present disclosure, a first raw image (also referred as an initial image) corresponding to an initial focal position is captured by the photographing device. In addition, the remaining raw images captured by the photographing device are referred as target images.

Figure 2:
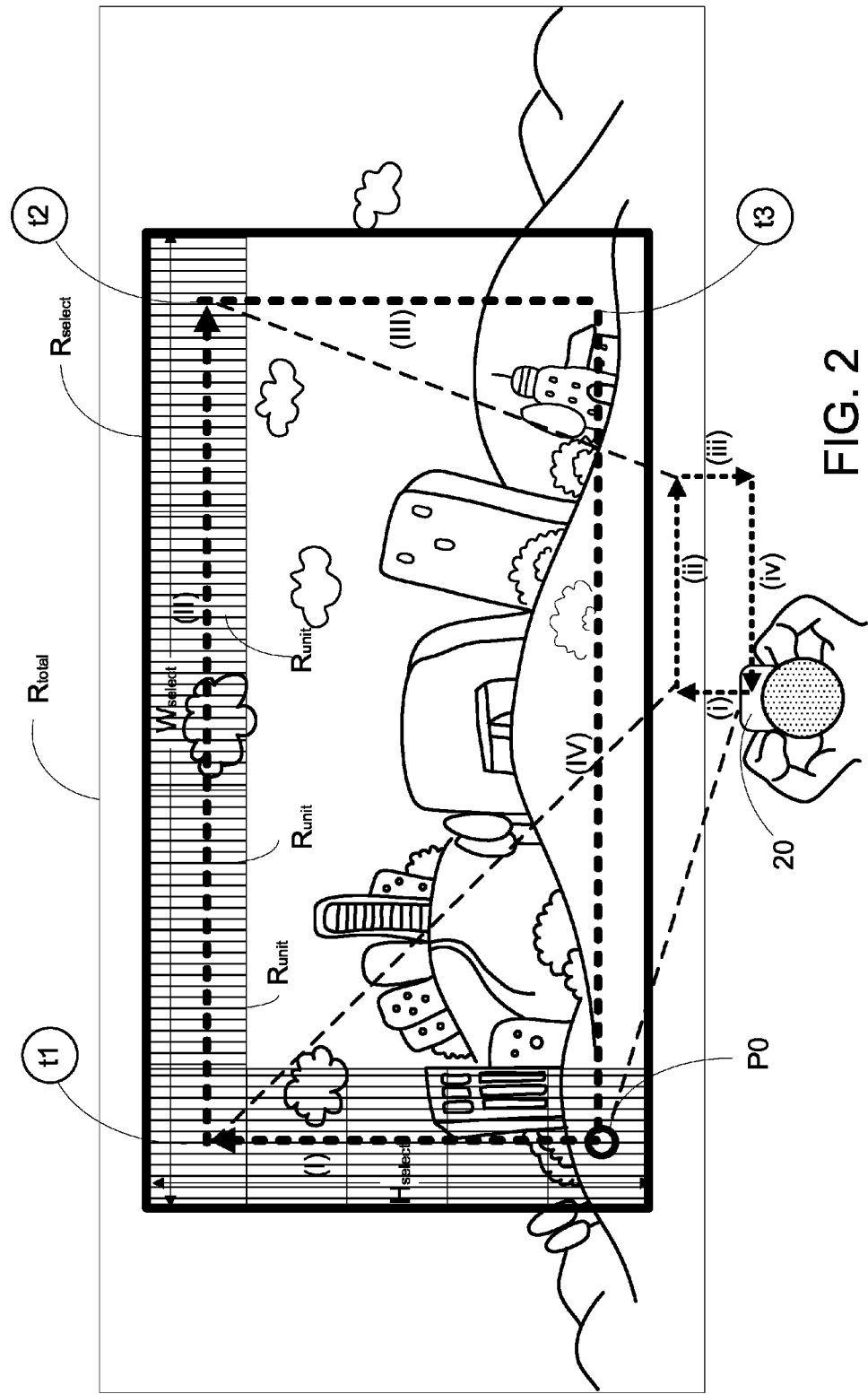
FIG. 2 schematically shows an approach of determining a designated area by rotating the photographing device.

FIG. 2 schematically shows an approach of determining a designated shooting area $R_{select}$ by rotating the photographing device. In FIG. 2, the designated shooting area $R_{select}$ is circumscribed by thick black lines. It is assumed that the center position of the capturing range $R_{unit}$ represents the actual focal position of the photographing device 20. The actual focal position of the photographing device 20 while capturing the initial image is defined as the initial focal position P0. As shown in FIG. 2, the capturing range corresponding to the initial image is located at a lower left corner of the designated shooting area $R_{select}$. It is noted that the capturing range corresponding to the initial image is not restricted to the lower left corner of the designated shooting area $R_{select}$.

Firstly, the photographing device 20 is rotated vertically along an upward direction (i) for a certain rotating extent. Correspondingly, the actual focal position is moved upwardly along the direction (I). After the actual focal position is shifted to a first turning position t1, the photographing device 20 is rotated horizontally along a rightward direction (ii). During the process of rotating the photographing device 20, the target images are simultaneously captured by the photographing device 20. In this embodiment, if the rotating direction of the photographing device 20 is changed, five raw images within the designated shooting area $R_{select}$ and along the vertical direction are simultaneously captured by the photographing device 20. Under this circumstance, the photographing device 20 realizes that the height of the designated shooting area $R_{select}$ is equal to five times the height of the capturing ranges $R_{unit}$ (that is, $H_{select}=5\times H_{unit}$). At the same time, the left edges of the five capturing ranges corresponding to the five captured raw images are collaboratively defined as a left boundary (or first boundary) of the designated shooting area $R_{select}$.

As the photographing device 20 is rotated horizontally along the rightward direction (ii) for a certain rotating extent, the actual focal position is moved along rightward direction (II). During the process of rotating the photographing device 20 along the rightward direction (ii), the target images are simultaneously captured by the photographing device 20. For example, additional six raw images along the rightward direction are captured by the photographing device 20. After the actual focal position is moved to a second turning position t2, the photographing device 20 is rotated vertically along a downward direction (iii). In other words, while the actual focal position is moved from the first turning position t1 to the second turning position t2, seven raw images are simultaneously captured by the photographing device 20. At the same time, the top edges of the seven capturing ranges corresponding to the seven captured raw images are collaboratively defined as a top boundary (or second boundary) of the designated shooting area $R_{select}$.

Then, if the photographing device 20 is rotated upwardly, the photographing device 20 may judge that the actual focal position is beyond the top boundary of the designated shooting area $R_{select}$. Under this circumstance, the photographing device 20 will not capture the target images. On the other hand, if the photographing device 20 is rotated vertically along the downward direction (iii), the photographing device 20 realizes that the actual focal position is within the designated shooting area $R_{select}$. Consequently, the corresponding target images are captured by the photographing device 20.

While the photographing device 20 is rotated vertically along the downward direction (iii), the photographing device 20 realizes that the width of the designated shooting area $R_{select}$ is equal to seven times the width of the capturing range $R_{unit}$ (that is, $W_{select}=7\times W_{unit}$). Meanwhile, the photographing device 20 realizes that the size of the designated shooting area $R_{select}$ is substantially equal to 35 (that is, 5×7) capturing ranges $R_{unit}$. In other words, the photographing device 20 has to capture 35 raw images.

Moreover, while the photographing device 20 is rotated vertically along the downward direction (iii), the right edges of the five capturing ranges are collaboratively defined as a right boundary (or third boundary) of the designated shooting area $R_{select}$. The left boundary and the right boundary (or third boundary) of the designated shooting area $R_{select}$ are in parallel with each other and equal. Consequently, if the actual focal position is moved downwardly from the second turning position t2 to a position lower than the initial focal position P0, the photographing device 20 stops capturing the target images.

Similarly, while the photographing device 20 is rotated horizontally along the leftward direction (iv) for a certain rotating extent, seven raw images are simultaneously captured. Accordingly, the bottom edges of the seven capturing ranges corresponding to the captured seven raw images are collaboratively defined as a bottom boundary (or fourth boundary) of the designated shooting area $R_{select}$. The bottom boundary (or fourth boundary) and the top boundary of the designated shooting area $R_{select}$ are in parallel with each other and equal. Consequently, if the actual focal position is moved leftwards from the third turning position t3 to a position next to a left side of the initial focal position P0, the photographing device 20 stops capturing the target images.

As shown in FIG. 2, the designated shooting area $R_{select}$ is determined by sensing the rotating trajectory of the photographing device 20. The vertical rotating extent of the photographing device 20 is corresponding to the height $H_{select}$ of the designated shooting area $R_{select}$. The length of the first boundary of the designated shooting area $R_{select}$ is determined according to the rotating extent of the photographing device 20 along a first direction (for example, a vertical direction) and a focusing distance of the photographing device 20. Similarly, the horizontal rotating extent of the photographing device 20 is corresponding to the width $W_{select}$ of the designated shooting area $R_{select}$. The length of the second boundary of the designated shooting area $R_{select}$ is determined according to the rotating extent of the photographing device 20 along a second direction different than the first direction (that is, a horizontal direction) and the focusing distance of the photographing device 20.

In this embodiment, the initial image is firstly captured by the photographing device 20. Then, the panorama focal positions required for the panoramic image are estimated by the photographing device 20 according to the initial image and the panorama algorithm. As mentioned above, the photographing device 20 has the function of allowing the user to define the designated shooting area $R_{select}$.

In case that the actual focal position is beyond the designated shooting area $R_{select}$, the photographing device 20 will not capture the target images. Whereas, in case that the actual focal position is within the designated shooting area $R_{select}$ and the focal position of the photographing device 20 is aligned with one of the panorama focal positions, the photographing device 20 will capture the target image. In this context, the panorama focal positions within the designated shooting area $R_{select}$ are also referred as designated focal positions.

Figure 3:
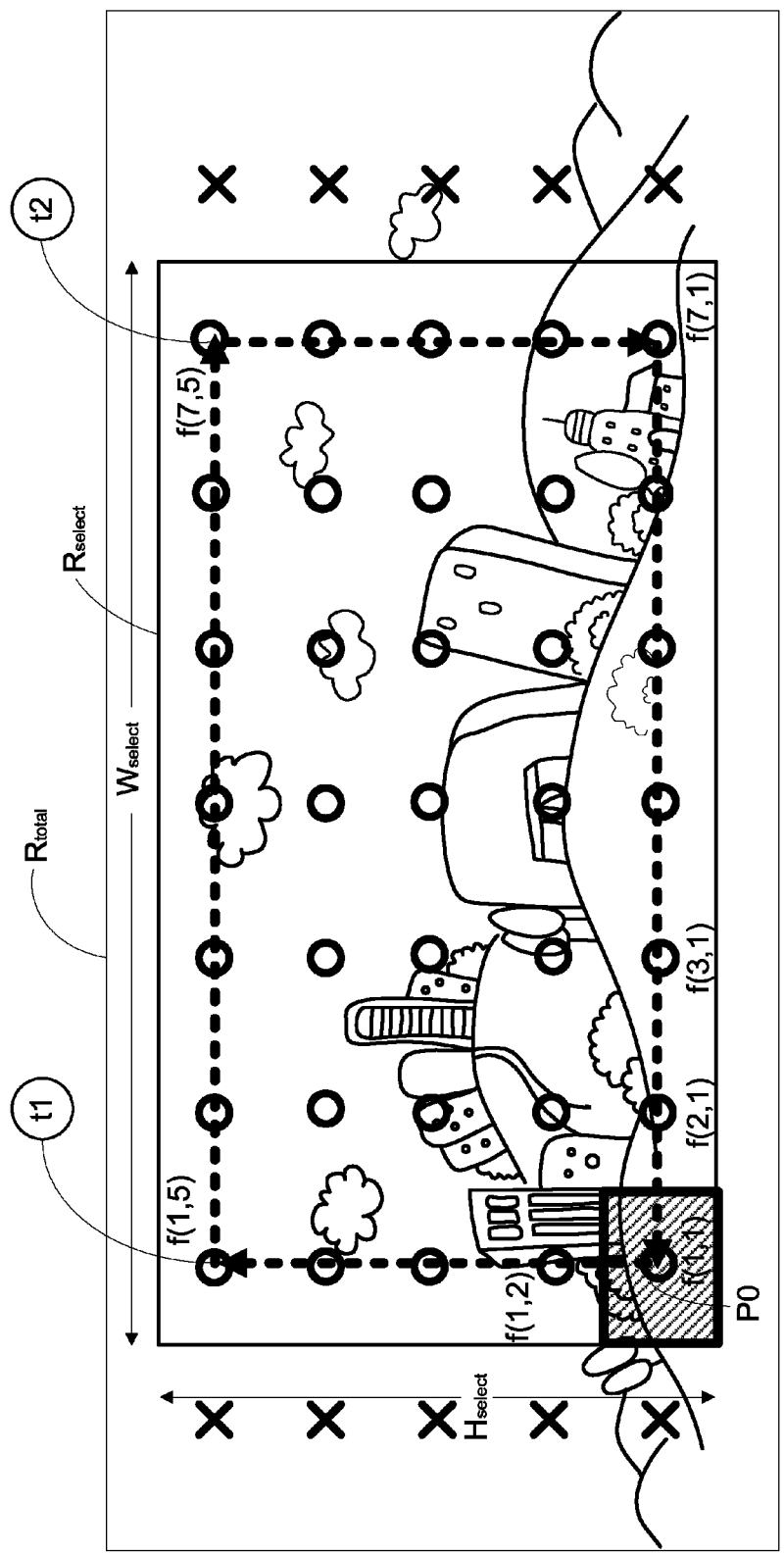
FIG. 3 schematically shows the designated focal positions.

FIG. 3 schematically shows the designated focal positions. In FIG. 3, the designated focal positions are indicated by circle marks (O), and the panorama focal positions beyond the designated shooting area $R_{select}$ are indicated by cross marks (X). As shown in FIG. 3, when the actual focal position of the photographing device 20 is aligned with the designated focal positions f(1,5), f(2,1), f(3,1), f(7,5) and so on, the corresponding target images are captured by the photographing device 20.

Figure 4:
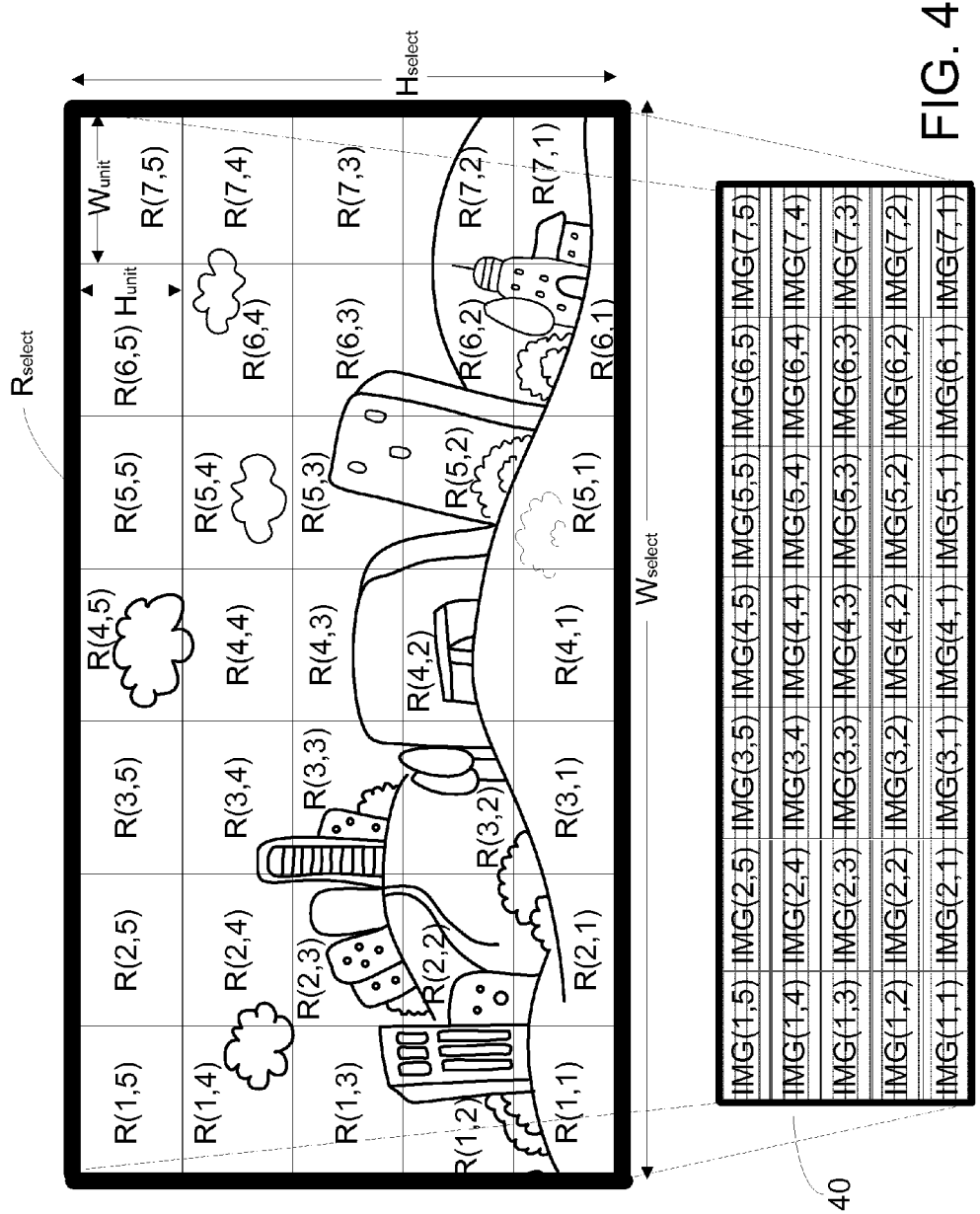
FIG. 4 schematically shows the relationships between the designated shooting area and the partial panoramic image.

FIG. 4 schematically shows the relationships between the designated shooting area and the partial panoramic image. The designated shooting area $R_{select}$ corresponds to plural capturing ranges $R_{unit}$. For clarification, the horizontal directions of the capturing ranges and the raw images are defined as x-axis coordinates, and the vertical directions of the capturing ranges and the raw images are defined as y-axis coordinates.

The capturing ranges $R_{unit}$ within the designated shooting area $R_{select}$ have respective designated focal positions. For example, the capturing range R(1,1) indicates the actual capturing range of the photographing device 20 when the actual focal position of the photographing device 20 is aligned with the designated focal position f(1,1).

From left to right, the capturing ranges of the photographing device 20 posterior to the capturing range R(1,1) are sequentially the capturing ranges R(2,1), R(3,1) R(4,1), R(5,1), R(6,1) and R(7,1). From bottom to top, the capturing ranges of the photographing device 20 posterior to the capturing range R(1,1) are sequentially the capturing ranges R(1,2), R(1,3), R(1,4) and R(1,5). The coordinates of the other capturing ranges $R_{unit}$ may be deduced by analogy.

The raw image at the lower left corner may be denoted as IMG(1,1). From left to right, the raw images posterior to the raw image IMG(1,1) are sequentially the raw images IMG(2,1), IMG(3,1), IMG(4,1), IMG(5,1), IMG(6,1) and IMG(7,1). From bottom to top, the raw images posterior to the raw image IMG(1,1) are sequentially the raw images IMG(1,2), IMG(1,3), IMG(1,4) and IMG(1,5). The coordinates of the other raw images may be deduced by analogy.

FIG. 5 schematically shows the partial panoramic image obtained by stitching the raw images. The arrangement sequence of the raw materials is identical to the arrangement sequence of the capturing ranges (see FIG. 4)

After these raw images are stitched together according to the coordinates of these raw images, the partial panoramic image 40 is generated. For example, since the designated focal position f(1,1) is located at the lower left corner of the designated shooting area $R_{select}$, the raw image IMG(1,1) that is captured by the photographing device 20 according to the capturing range R(1,1) is located at the lower left corner of the partial panoramic image 40. That is, when the raw images are captured, the relative positions of the capturing ranges are also recorded. According to these raw images and the relative positions of the capturing ranges, the partial panoramic image 40 as shown in FIG. 5 can be correctly generated.

It is noted that the timing of capturing the target images is not restricted. In accordance with a first approach, all target images are captured after the designated shooting area $R_{select}$ is determined. In accordance with a second approach, some of the target images are captured during the process of determining the designated shooting area $R_{select}$ and the rest of the target images are captured after the designated shooting area $R_{select}$ is determined. In the following embodiments, the timing of capturing the target images is determined by the second approach.

Figure 6A:
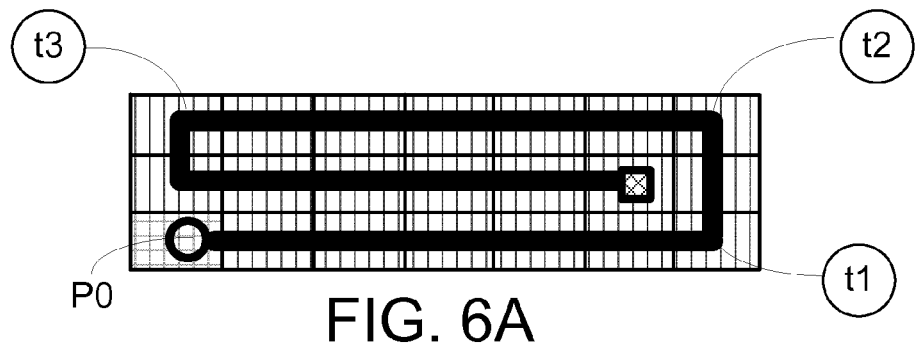
FIGS. 6A, 6B and 6C schematically show three kinds of moving trajectories of the actual focal position.
Figure 6B:
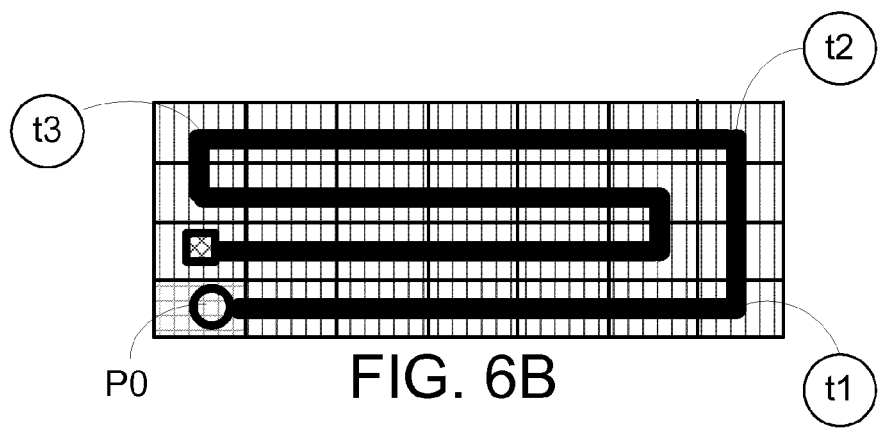
Figure 6C:
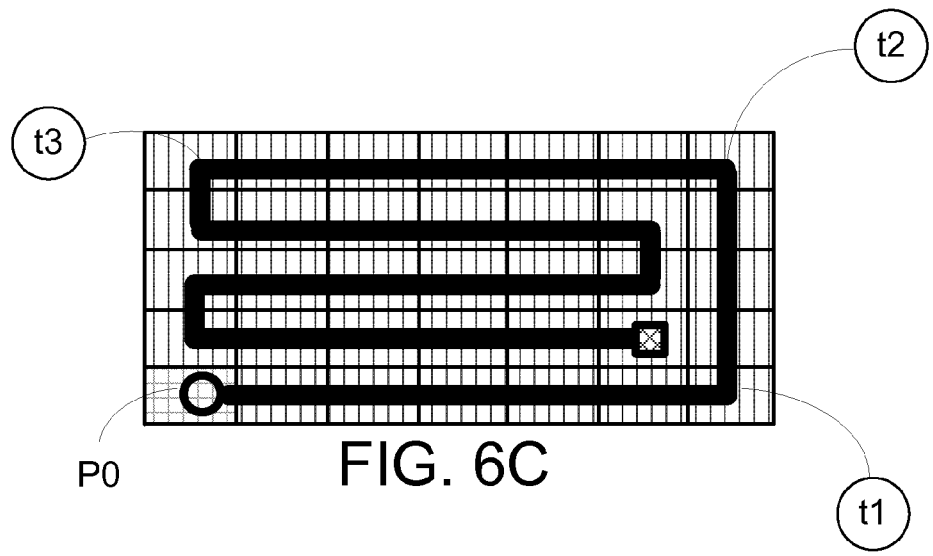

FIGS. 6A, 6B and 6C schematically show three kinds of moving trajectories of the actual focal position. In comparison with FIG. 2, the sequence of defining the boundaries is distinguished. As shown in FIGS. 6A, 6B and 6C, the first boundary is defined along the horizontal direction, and the second boundary is defined along the vertical direction. The way of rotating the photographing device 20 to define the designated shooting area $R_{select}$ is similar to that described in FIG. 2.

While the actual focal position is moved horizontally along the rightward direction to a first turning position t1, the target images corresponding to the capturing ranges $R_{unit}$ beside the first boundary are simultaneously captured by the photographing device 20. Then, the actual focal position is moved vertically along the upward direction to a second turning position t2. Similarly, while the actual focal position is moved vertically along the upward direction to the second turning position t2, the target images corresponding to the capturing ranges $R_{unit}$ beside the second boundary are simultaneously captured by the photographing device 20.

Referring to FIGS. 6A, 6B and 6C, after the first boundary (that is, the bottom boundary) and the second boundary (that is, the right boundary) are defined, a third boundary (for example, a top boundary) in parallel with the first boundary and a fourth boundary (for example, a left boundary) in parallel with the second boundary are consequentially defined.

The locations of the second turning position t2 as shown in FIGS. 6A, 6B and 6C are distinguished. As the second turning position t2 is farther from the first boundary, the second boundary is longer and the designated shooting area $R_{select}$ is larger. In FIG. 6A, the height of the second boundary is equal to three times the height of one capturing range. In FIG. 6B, the height of the second boundary is equal to four times the height of one capturing range. In FIG. 6C, the height of the second boundary is equal to five times the height of one capturing range. Consequently, size of the designated shooting areas $R_{select}$ of FIGS. 6A, 6B and 6C are ranked in an ascending order.

As shown in FIG. 6A, after the target images corresponding to the capturing ranges beside the four boundaries are captured, the remaining target images are captured. As shown in FIGS. 6B and 6C, after the target images beside the first, second and third boundaries are captured, the remaining target images are captured.

More especially, a preview screen may be displayed on the display panel of the photographing device 20. The contents of the preview screen contain the image of the capturing range $R_{unit}$. In case that the photographing device is rotated by the user, the contents of the capturing range $R_{unit}$ and the contents of the preview screen are correspondingly changed.

Moreover, a graphic user interface (hereinafter, GUI) may be shown on the display panel of the photographing device 20 to provide various prompt patterns. For example, the prompt patterns include a focusing frame, a target pattern and/or a warning message etc. During the image-capturing process, the profiles and positions of the prompt patterns are correspondingly determined according to the contents of the preview screen. The prompt patterns may guide the user to capture the target images.

For example, the focusing frame indicates the actual focal position, and the target patterns indicate the designated focal positions. According to the relative position between the focusing frame and the target pattern, the user may realize whether the actual focal position is aligned with the designated focal position. It is noted that the profiles and types of the prompt patterns are not restricted.

Moreover, the preview screen provided by the photographing device 20 may be displayed on the display panel in two display modes. In case that the capturing range $R_{unit}$ is within the designated shooting area $R_{select}$, the preview screen is displayed in the first display mode. Whereas, in case that the capturing range $R_{unit}$ is beyond the designated shooting area $R_{select}$, the preview screen is displayed in the second display mode. In different display modes, the preview screen displayed on the display panel has different display parameters (for example, brightness parameters, transparency parameters, gray level parameters or color tone parameters).

Figure 7:
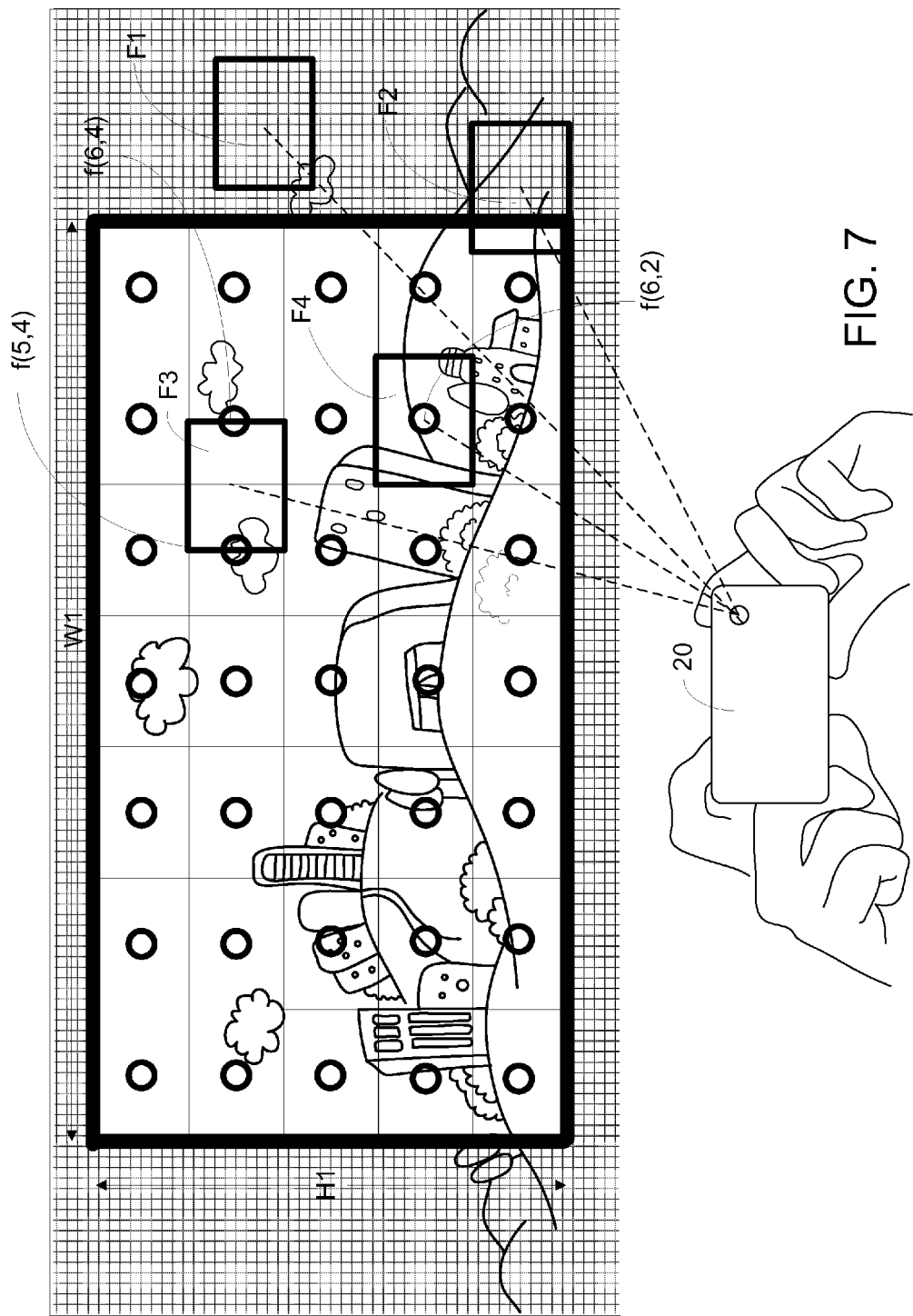
FIG. 7 schematically illustrates the relationships between some capturing ranges and the designated shooting area in response to the rotation of the photographing device.

FIG. 7 schematically illustrates the relationships between some capturing ranges and the designated shooting area in response to the rotation of the photographing device. In this embodiment, if the capturing range $R_{unit}$ is beyond the designated shooting area $R_{select}$, the preview screen is displayed with a darker transparency.

In FIG. 7, the relative positions between four capturing ranges $R_{unit}$ (F1, F2, F3 and F4) and the designated shooting area $R_{select}$ are shown. The capturing range F1 is completely beyond the designated shooting area $R_{select}$. The capturing range F2 is partially within the designated shooting area $R_{select}$ and partially beyond the designated shooting area $R_{select}$. The capturing ranges F3 and F4 are completely within the designated shooting area $R_{select}$. Hereinafter, the preview screens corresponding to the four capturing ranges $R_{unit}$ (F1, F2, F3 and F4) will be illustrated with reference to FIGS. 8, 9, 10 and 11.

Figure 8:
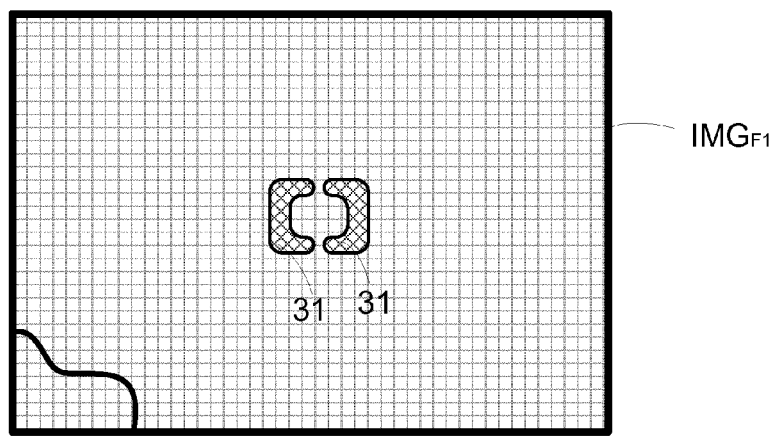
FIG. 8 schematically illustrates a preview screen displayed on a photographing device, in which the capturing range is completely beyond the designated shooting area.

FIG. 8 schematically illustrates a preview screen displayed on a photographing device, in which the capturing range is completely beyond the designated shooting area. The preview screen $IMG_{F1}$ displays the capturing range $R_{unit}$ and the focusing frame 31. The focusing frame 31 includes a left part and a right part. The region circumscribed by the focusing frame 31 indicates the actual focal position of the lens of the photographing device 20. Generally, the focusing frame 31 is located at the center of the preview screen.

For prompting the user that the capturing range $R_{unit}$ is completely beyond the designated shooting area $R_{select}$, the preview screen is displayed in the second display mode. Meanwhile, the photographing device 20 stops capturing the raw image. Alternatively, a warning message may be shown on the preview screen to notify the user that the current capturing range $R_{unit}$ is completely beyond the designated shooting area $R_{select}$.

Figure 9:
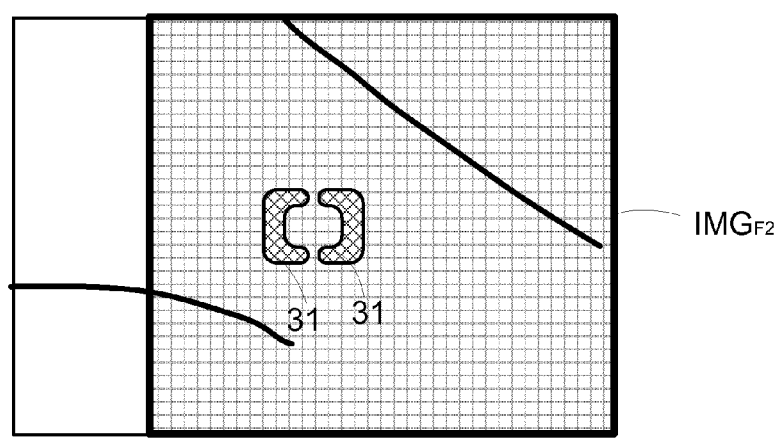
FIG. 9 schematically illustrates a preview screen displayed on a photographing device, in which the capturing range is partially within the designated shooting area and partially beyond the designated shooting area.

FIG. 9 schematically illustrates a preview screen displayed on a photographing device, in which the capturing range is partially within and partially beyond the designated shooting area. According to the panorama algorithm, there is no designated focal position within the current capturing range $R_{unit}$. Consequently, none of the target patterns indicating the designated focal positions are shown on the preview screen.

For prompting the user that the actual focal position is beyond the designated shooting area $R_{select}$, the portion of the preview screen corresponding to the region beyond the designated shooting area $R_{select}$ is displayed with a darker transparency (that is, a second transparency). As shown in FIG. 9, the right portion of the preview screen is displayed with a darker transparency (that is, a second transparency), and the left portion of the preview screen is displayed with a brighter transparency (that is, a first transparency). According to the prompt patterns, the user may realize that the rotation of the photographing device 20 along the rightward direction fails to capture the target image.

In case that the actual focal position is within the designated shooting area $R_{select}$, the user has to judge whether the actual focal position is aligned with a corresponding designated focal position or not. When the actual focal position is not aligned with any designated focal position, the photographing device 20 does not capture the contents of the preview screen.

For example, the actual focal position of the capturing range F3 as shown in FIG. 7 is not aligned with any designated focal position. Consequently, the contents of the preview screen $IMG_{F3}$ shown in FIG. 10 are not captured by the photographing device 20.

Figure 11:
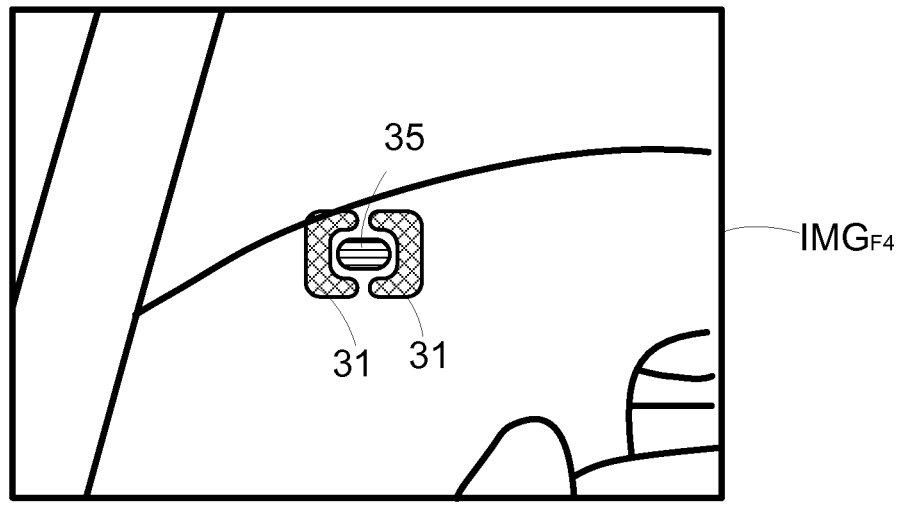
FIG. 11 schematically illustrates a preview screen displayed on a photographing device, in which the capturing range is completely within the designated shooting area and the actual focal position is aligned with one designated focal position.

On the other hand, if the actual focal position is aligned with one of the designated focal positions, the photographing device 20 will capture the contents of the preview screen as the target image. For example, the actual focal position of the capturing range F4 as shown in FIG. 7 is aligned with a designated focal position. Consequently, the contents of the preview screen $IMG_{F4}$ shown in FIG. 11 are captured as the target image by the photographing device 20.

Figure 10:
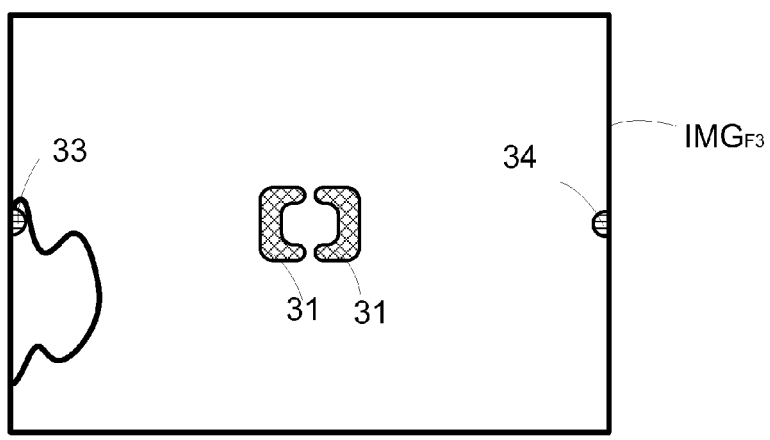
FIG. 10 schematically illustrates a preview screen displayed on a photographing device, in which the capturing range is completely within the designated shooting area but the actual focal position is not aligned with any designated focal position.

FIG. 10 schematically illustrates a preview screen displayed on a photographing device, in which the capturing range is completely within the designated shooting area $R_{select}$ but the actual focal position is not aligned with any designated focal position. The preview screen $IMG_{F3}$ denotes the capturing range F3 as shown in FIG. 7.

The target patterns 33 and 34 are not circumscribed by the focusing frame 31. As shown in FIG. 10, the target pattern 33 corresponding to the designated focal position f(5,4) and the target pattern 34 corresponding to the designated focal position f(6,4) are respectively located at the left side and right left side of the focusing frame 31. For capturing the target image, the user may realize how to move the actual focal position according to the preview screen by rotating the photographing device 20.

For example, by rotating the photographing device 20 along the leftward direction, the actual focal position of the photographing device 20 may be aligned with the designated focal position f(5,4). That is, the target pattern 33 will be circumscribed by the focusing frame 31. Alternatively, by rotating the photographing device 20 along the rightward direction, the target pattern 34 will be circumscribed by the focusing frame 31.

FIG. 11 schematically illustrates a preview screen displayed on a photographing device, in which the capturing range is completely within the designated shooting area and the actual focal position is aligned with one designated focal position. The preview screen $IMG_{F4}$ denotes the capturing range F4 as shown in FIG. 7. For example, as shown in FIG. 11, the target pattern 35 corresponding to the designated focal position f(6,2) is circumscribed by the focusing frame 31. Consequently, the contents of the preview screen $IMG_{F4}$ are captured as the target image by the photographing device 20.

Figure 12:
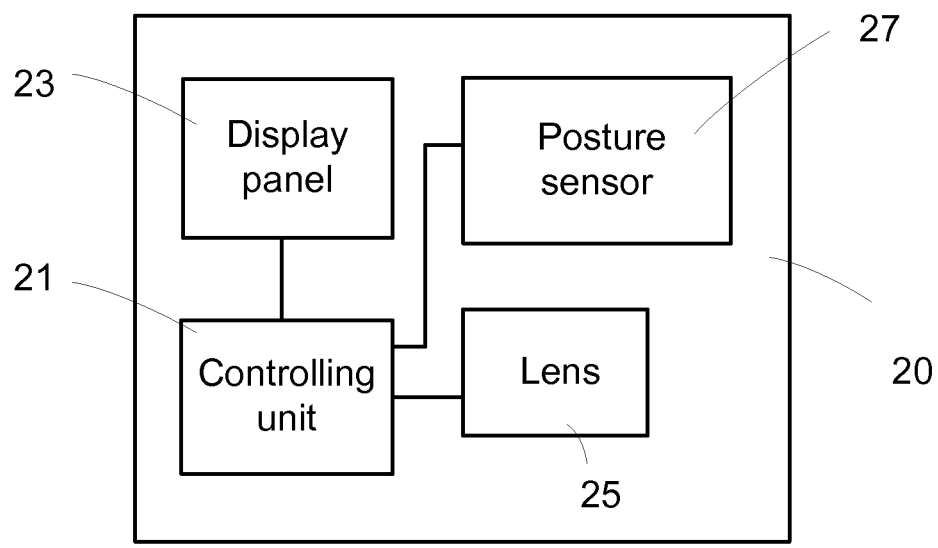
FIG. 12 is a schematic functional block diagram illustrating the photographing device according to an embodiment of the present disclosure.

FIG. 12 is a schematic functional block diagram illustrating the photographing device according to an embodiment of the present disclosure. As shown in FIG. 12, the photographing device 20 includes a display panel 23, a controlling unit 21, a posture sensor 27, and a lens 25. The controlling unit 21 is electrically connected with the display panel 23, the posture sensor 27 and the lens 25. The lens 25 is used for capturing the raw images. The preview screen may be displayed on the display panel 23.

When the lens 25 is aimed at a scene, a preview screen is displayed on the display panel 23 by the controlling unit 21. In case that the photographing device is rotated by the user, the contents of the preview screen are correspondingly changed. As mentioned above, if the capturing range is completely within the designated shooting area $R_{select}$ and the actual focal position is aligned with one designated focal position, the preview screen may be captured as the target image. After the process of capturing the raw images is completed, the raw images are stitched as the partial panoramic image by the controlling unit 21. Then, in response to the user's operation, the partial panoramic image may be shown on the display panel 23.

The posture sensor 27 is used for sensing an orientation status of the photographing device 20. When the photographing device 20 is rotated in response to the user's operation, the posture sensor 27 continuously issues posture signals to the controlling unit 21. The posture signals may indicate the rotating trajectory (for example, the rotating extent and the rotating direction) of the photographing device 20. For example, the posture sensor 27 is a gyroscope, a G-sensor or any other appropriate sensing element.

In case that the posture signal indicates the rotating extent of the photographing device 20, the moving distance of the actual focal position may be calculated by the photographing device 20 according to the posture signals. For example, according to the rotating extent of the photographing device 20 along the first direction and the focusing distance of the photographing device 20, the length of the first boundary may be calculated. Moreover, according to the rotating extent of the photographing device 20 along the second direction and the focusing distance of the photographing device 20, the length of the second boundary may be calculated.

If the posture signal indicates that the rotating direction is changed, the controlling unit 21 may determine the length of a boundary of the designated shooting area $R_{select}$, or the controlling unit 21 may judge whether the actual focal position is beyond the designated shooting area $R_{select}$.

When the orientation of the lens 25 is changed, the capturing range $R_{unit}$ and the actual focal position are correspondingly changed. Consequently, the contents of the preview screen, for example, the profiles and positions of the prompt patterns, shown on the display panel 23 are changed. By means of the prompt patterns, the user may judge whether the capturing range $R_{unit}$ of the photographing device 20 is suitably captured as the target image or not.

It is noted that the target images may be manually or automatically captured by the photographing device 20. The method of manually or automatically capturing the target images is not described herein.

Figure 13A:
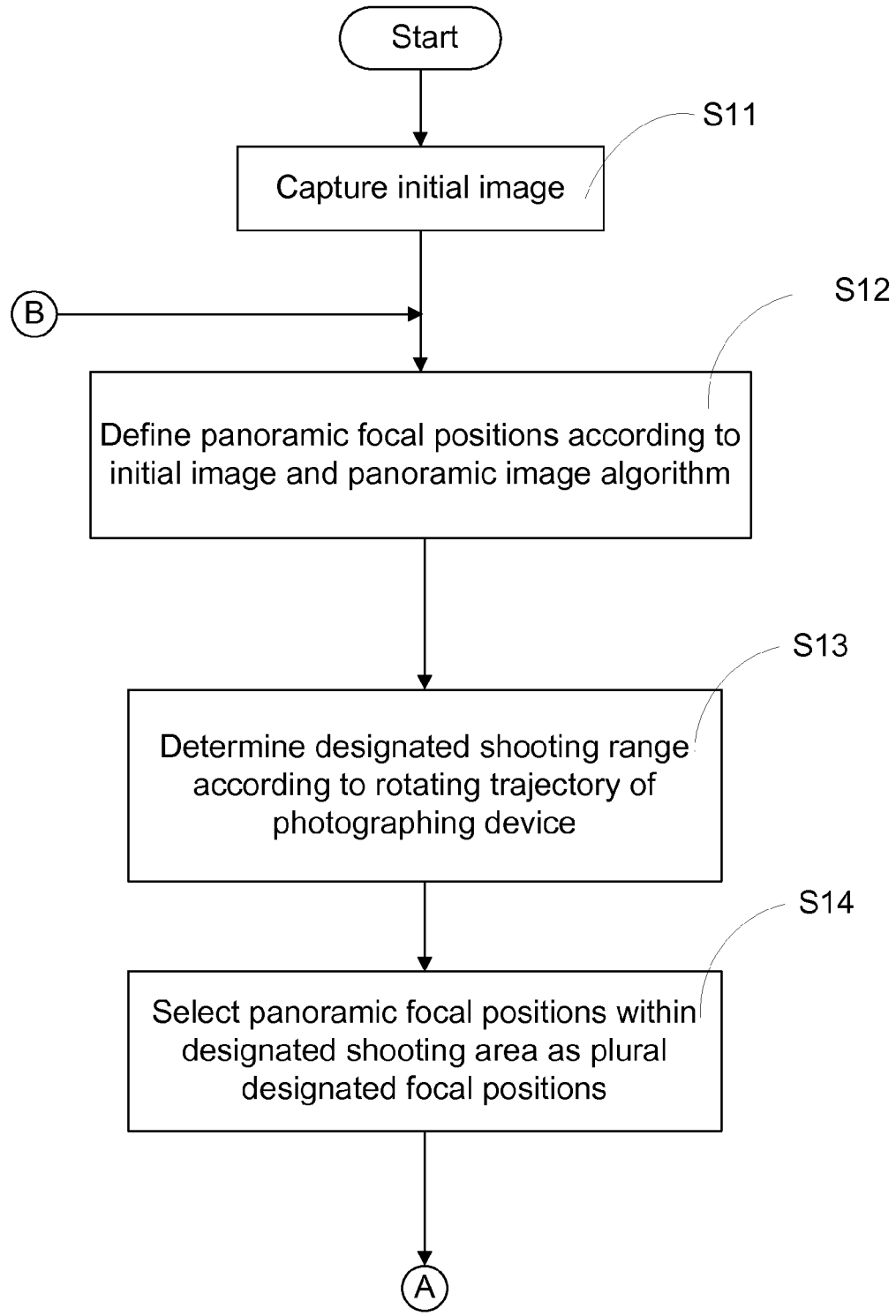
FIGS. 13A and 13B are flowcharts illustrating a panorama photographing method according to an embodiment of the present disclosure.
Figure 13B:
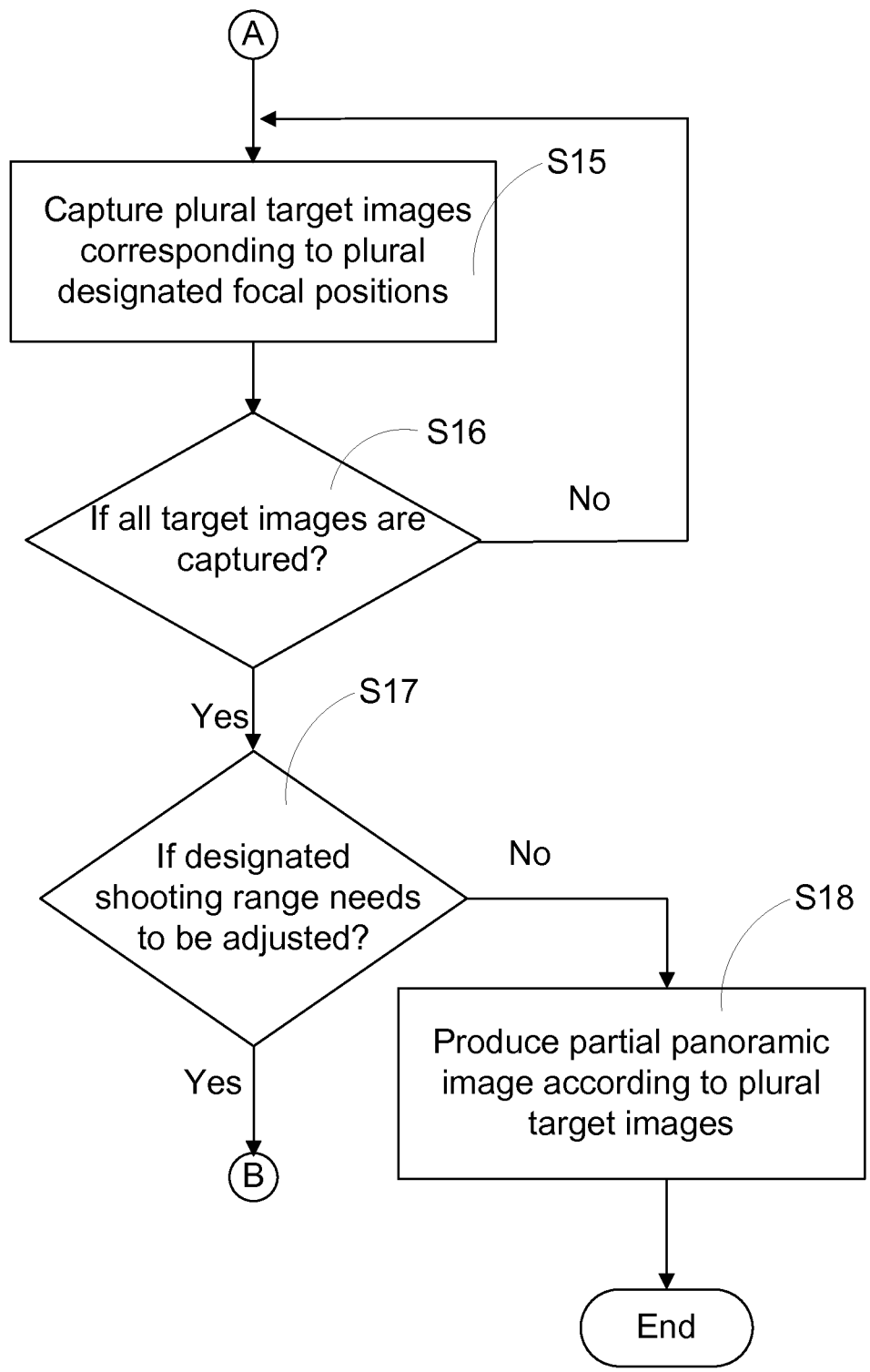

FIGS. 13A and 13B are flowcharts illustrating a panorama photographing method according to an embodiment of the present disclosure. Firstly, an initial focal position P0 is selected according to the user's preference and an initial image is captured by the photographing device 20 (Step S11). Then, the panorama focal positions required for a full panoramic image are defined by the controlling unit 21 according to the initial image and the panorama algorithm (Step S12). The panorama focal positions for acquiring the full panoramic image are distinguished according to the spherical perspective projection method or the cylindrical perspective projection. The projection method to calculate the panorama focal positions and the panorama algorithm may be adopted according to the practical requirements.

Then, a rotating trajectory of the photographing device 20 is sensed by the posture sensor 27, and a designated shooting area $R_{select}$ is determined by sensing the rotating trajectory of the photographing device 20 (Step S13). The detailed procedures of the step S13 may be illustrated in more details with reference to the flowchart of FIG. 14. After the designated shooting area $R_{select}$ is determined, the panorama focal positions within the designated shooting area $R_{select}$ are taken as plural designated focal positions (Step S14).

Then, plural target images corresponding to the plural designated focal positions are accordingly captured by the photographing device 20 (Step S15). As mentioned above, prompt patterns (for example, the focusing frame, the target pattern and/or the warning message) are shown on the graphic user interface to guide the user to capture the target images. Moreover, the controlling unit 21 judges whether all target images are captured (Step S16). If the judging condition of the step S16 is not satisfied, the step S15 is repeatedly done until the remaining target images are captured. Whereas, if the judging condition of the step S16 is satisfied, it means that the target images corresponding to all designated focal positions have been captured.

Moreover, the photographing device 20 may provide the function of adjusting the designated shooting area $R_{select}$. After all target images are captured, if the user intends to adjust the designated shooting area $R_{select}$ (Step S17), the step S13 is repeatedly done. Otherwise, a partial panoramic image is generated by stitching the initial image and the plural target images together (Step S18).

Figure 14A:
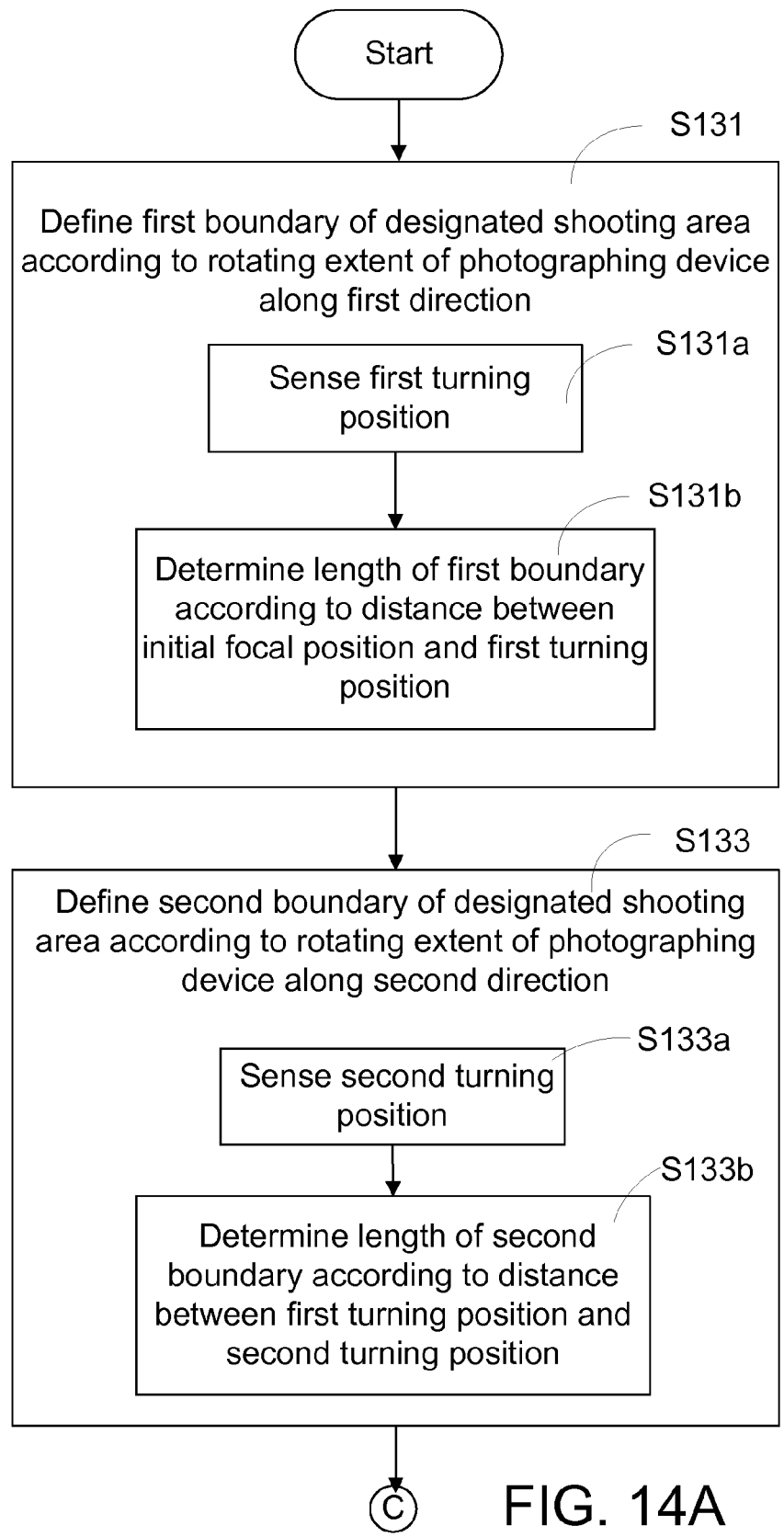
FIGS. 14A and 14B are flowcharts illustrating a method of determining the designated shooting area by sensing the rotating trajectory of the photographing device.
Figure 14B:
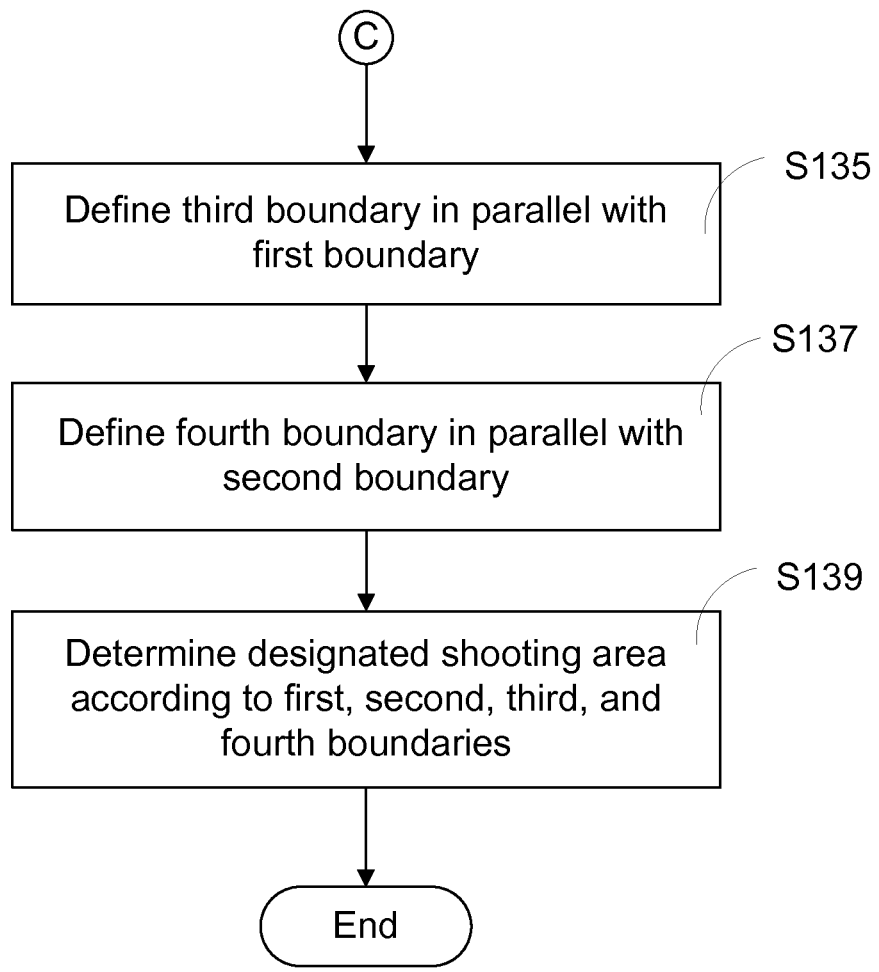

FIGS. 14A and 14B are flowcharts illustrating a method of determining the designated shooting area by sensing the rotating trajectory of the photographing device. Firstly, a first boundary of the designated shooting area $R_{select}$ is defined according to a rotating extent of the photographing device 20 along a first direction (Step S131). Then, a second boundary of the designated shooting area $R_{select}$ is defined according to a rotating extent of the photographing device 20 along a second direction different than the first direction (Step S133). As mentioned in FIG. 2, the rotating extent of the photographing device 20 is equivalent to the moving distance of the actual focal position. According to the moving distance of the actual focal position, the length of the boundaries of the designated shooting area $R_{select}$ can be estimated.

After the first boundary and the second boundary of the designated shooting area $R_{select}$ are defined, a third boundary in parallel with the first boundary is defined (Step S135), and a fourth boundary in parallel with the second boundary is defined (Step S137). In this embodiment, the designated shooting area $R_{select}$ has a rectangular shape. Consequently, the length of the first boundary and the length of the third boundary are equal, and the length of the second boundary and the length of the fourth boundary are equal. Then, the designated shooting area $R_{select}$ is determined according to the first, the second, the third and the fourth boundaries (Step S139).

The step S131 includes the steps S131a and S131b. In the step S131a, a first turning position t1 of the actual focal position is sensed. In the step S131b, the length of the first boundary is determined according to the distance between the initial focal position P0 and the first turning position t1. The step S133 includes the steps S133a and S133b. In the step S133a, a second turning position t2 of the actual focal position is sensed. In the step S133b, the length of the second boundary is determined according to the distance between the first and the second turning positions t1, t2.

In some other embodiments, the size of the designated shooting area $R_{select}$ may be dynamically adjusted by sensing the rotating trajectory of the photographing device 20.

Figure 15:
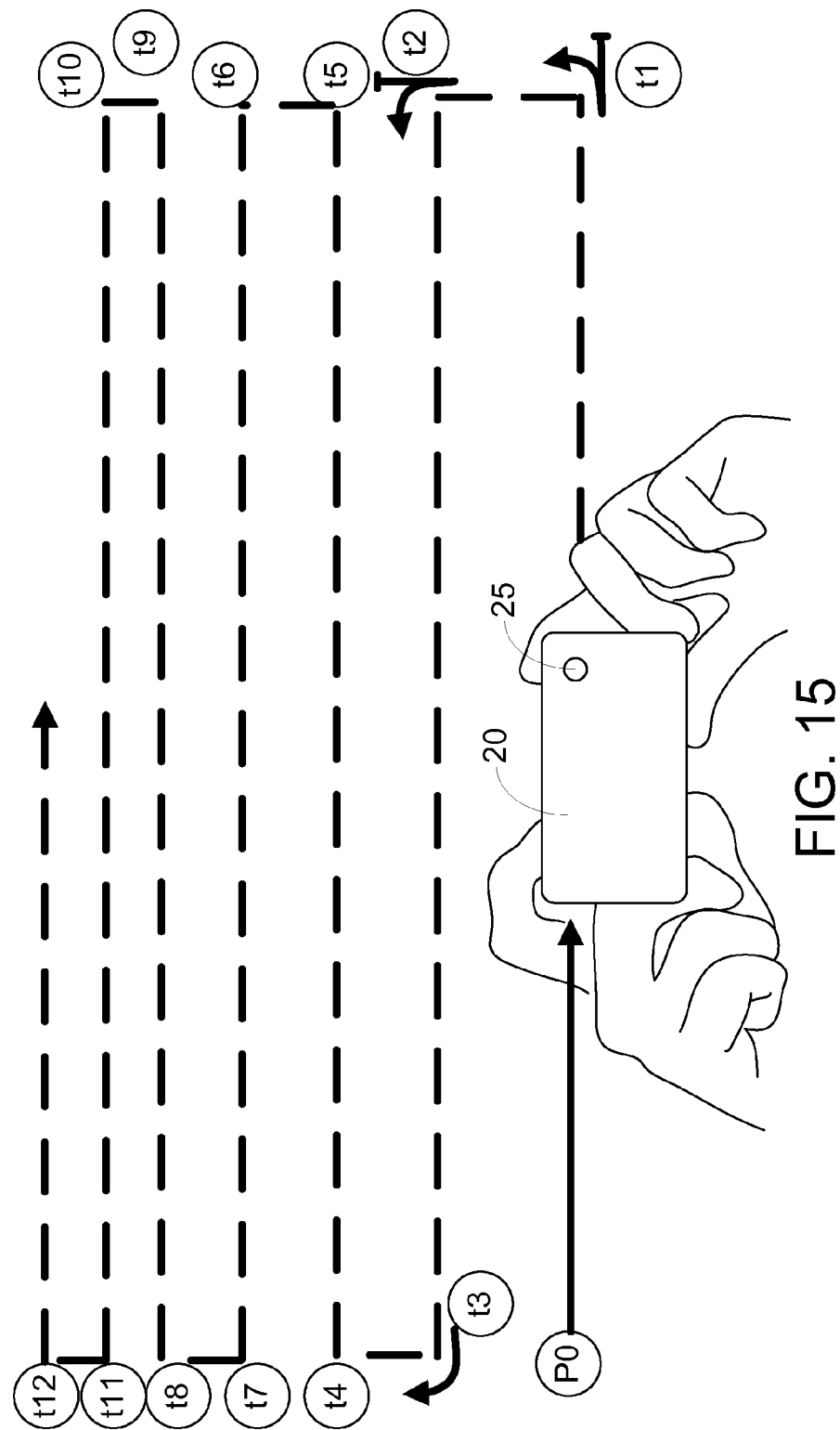
FIG. 15 schematically shows an approach of dynamically adjusting a designated shooting area according to an embodiment of the present disclosure.

FIG. 15 schematically shows an approach of dynamically adjusting a designated shooting area according to an embodiment of the present disclosure. Firstly, the actual focal position of the photographing device 20 is horizontally moved from an initial focal position P0 to a first turning position t1 along a rightward direction. Then, the actual focal position is vertically moved from the first turning position t1 to a second turning position t2 along an upward direction. Then, the actual focal position of the photographing device 20 is horizontally moved from the second turning position t2 to a third turning position t3 along a leftward direction.

Generally, the third turning position t3 and the initial focal position P0 are located at the same vertical line. If the horizontal moving extent of the photographing device 20 is too large, the actual focal position is located at an upper left side of the initial focal position P0. Under this circumstance, a warning message is shown on the graphic user interface to notify the user. Consequently, the left boundary of the designated shooting area $R_{select}$ may be adjusted to be along the same vertical line.

If the user stops capturing the target image when the actual focal position is at the third turning position t3, the designated shooting area $R_{select}$ is defined by two rows of the capturing ranges $R_{unit}$. That is, the height of the designated shooting area $R_{select}$ is equal to two times the height of the capturing range $R_{unit}$ (that is, $H_{select}=2\times H_{unit}$).

When the actual focal position is at the third turning position t3, if the photographing device 20 is rotated upwardly, the actual focal position is moved upwardly. Meanwhile, the position of the actual focal position is higher than the third turning position t3. Under this circumstance, a warning message is shown on the graphic user interface to notify the user.

If the actual focal position is unintentionally moved to the position higher than the third turning position t3, the user may stop capturing the target image according to the warning message. On the other hand, if the user actually wants to change the height of the designated shooting area $R_{select}$, the process of adjusting the designated shooting area $R_{select}$ will be continuously performed. When the actual focal position is at a fourth turning position t4, if the photographing device 20 is rotated horizontally along the rightward direction, the actual focal position is continuously moved along the rightward direction.

Similarly, when the actual focal position is moved to a fifth turning position t5 along the rightward direction, the photographing device 20 may check whether the actual focal position is at the right boundary. If the user stop capturing the target image when the actual focal position is at the fifth turning position t5, the designated shooting area $R_{select}$ is defined by three rows of the capturing ranges $R_{unit}$. That is, the height of the designated shooting area $R_{select}$ is equal to three times the height of the capturing range $R_{unit}$ (that is, $H_{select}=3\times H_{unit}$).

Similarly, if the actual focal position is moved upwardly from the fifth turning position t5 to a sixth turning position t6 and moved horizontally to a seventh turning position t7, the designated shooting area $R_{select}$ is defined by four rows of the capturing ranges $R_{unit}$. That is, the height of the designated shooting area $R_{select}$ is equal to four times the height of the capturing range $R_{unit}$ (that is, $H_{select}=4\times H_{unit}$).

From the above discussions, when the actual focal position is at the third, the fifth, or the seventh turning position t3, t5, t7, the height of the capturing range $R_{unit}$ is increased if the photographing device 20 is rotated upwardly. In other words, the photographing device 20 may notify the user whether the vertical height of the actual focal position is about to be changed. Consequently, the height of the capturing range $R_{unit}$ is dynamically adjusted according to the user's requirements.

Figure 16:
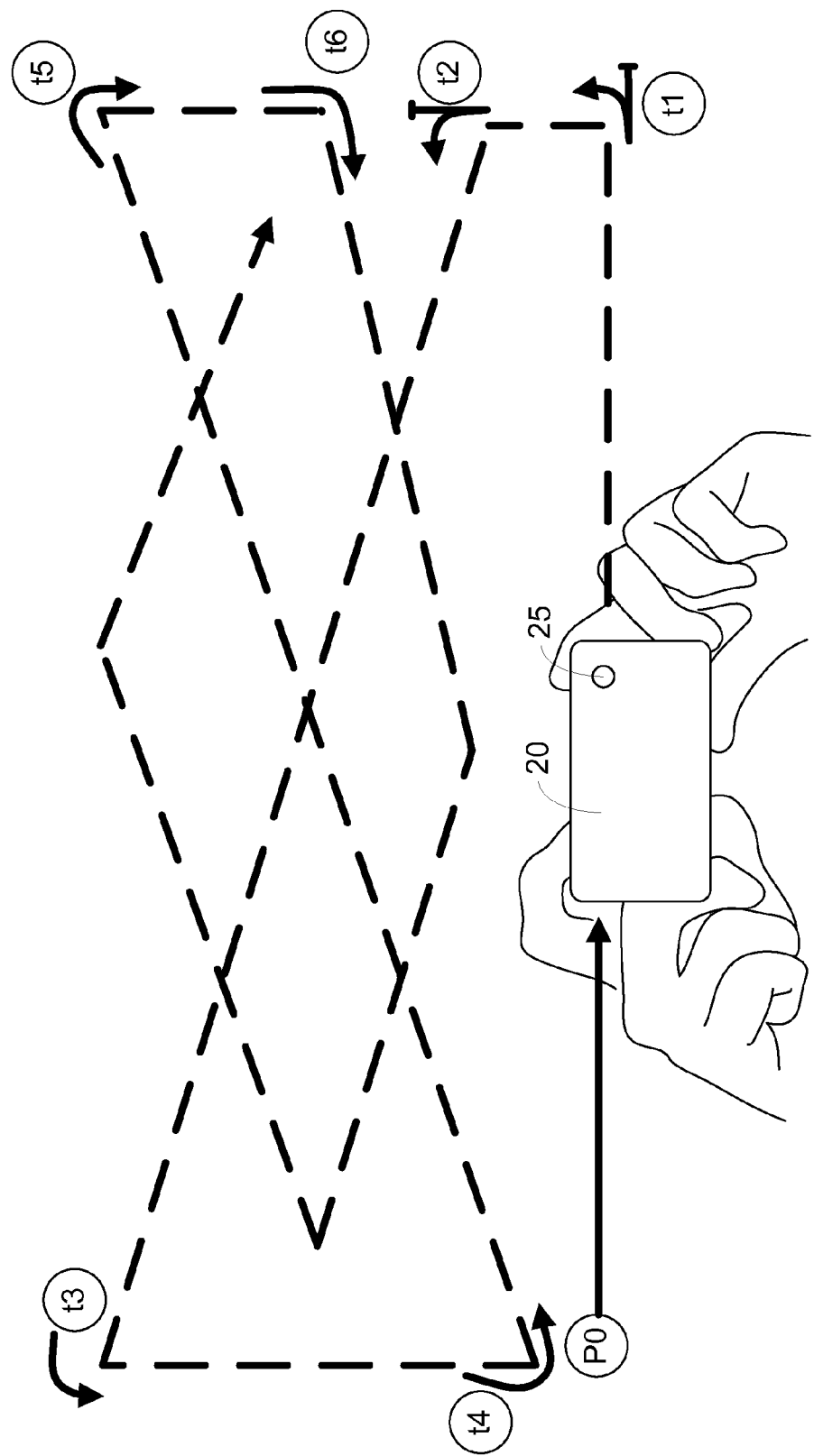
FIG. 16 schematically shows another approach of dynamically adjusting a designated shooting area according to another embodiment of the present disclosure.

FIG. 16 schematically shows another approach of dynamically adjusting a designated shooting area $R_{select}$ according to another embodiment of the present disclosure. Firstly, the actual focal position of the photographing device 20 is horizontally moved from an initial focal position P0 to a first turning position t1 along a rightward direction. Then, the actual focal position is vertically moved from the first turning position t1 to a second turning position t2 along an upward direction. Meanwhile, the bottom boundary of the designated shooting area $R_{select}$ is defined by the line passing through the initial focal position P0 and the first turning position t1.

After the actual focal position is moved upwardly from the first turning position t1 to the second turning position t2, the actual focal position is moved toward the upper left side. Since the actual focal position is higher than the second turning position t2, the height of the second turning position t2 is not considered as the height $H_{select}$ of the designated shooting area $R_{select}$. Meanwhile, the right boundary of the designated shooting area $R_{select}$ is defined by the line passing through the first and the second turning positions t1, t2.

When the actual focal position is moved from the second turning position t2 to a third turning position t3, if the photographing device 20 is continuously rotated along the leftward direction, the actual focal position is beyond the left boundary of the designated shooting area $R_{select}$. Consequently, when the actual focal position is moved to the third turning position t3, a warning message is shown on the graphic user interface to notify the user. Under this circumstance, the actual focal position may be moved vertically from the third turning position t3 or moved along the rightward direction.

When the actual focal position is moved to the third turning position t3, if the actual focal position is moved downwardly, the height of the third turning position t3 may be considered as the height of the designated shooting area $R_{select}$ because the third turning position t3 is higher than the second turning position t2. When the actual focal position is moved to a position slightly over the initial focal position P0, a warning message is shown on the graphic user interface to notify the user that the actual focal position is close to the bottom boundary of the designated shooting area $R_{select}$. Under this circumstance, by continuously rotating the photographing device 20, the actual focal position is moved toward an upper right side from a fourth turning position t4.

When the actual focal position is moved from the fourth turning position t4 to a fifth turning position t5, the photographing device 20 realizes that the height of the actual focal position is substantially equal to the height of the third turning position t3. Under this circumstance, a warning message may notify the user of stopping rotating the photographing device 20 in the upward direction. Moreover, since the fifth turning position t5 and the first turning position t1 are located at the same vertical line, a warning message may be shown on the graphic user interface to notify the user that the photographing device 20 is not permitted to be moved along the rightward direction.

From the above discussions, after the actual focal position is moved to the fifth turning position t5, the actual focal position may be moved along the leftward direction or the downward direction according to the relationship between the fifth turning position t5 and the third turning position t3 (and the first turning position t1). If the photographing device 20 is moved downwardly to a sixth turning position t6, since the underlying raw images have been captured and the sixth turning position t6 is located at the right boundary of the designated shooting area $R_{select}$, the photographing device 20 will be rotated toward the lower left side.

As mentioned in FIG. 16, the user may arbitrarily rotate the photographing device 20 to capture the raw images of the partial panoramic image while referring to the graphic user interface. Moreover, after the photographing device 20 are arbitrarily rotated to define the designated shooting area $R_{select}$ and capture the raw images, if the user finds that the raw images corresponding to some designated focal positions are not captured, the graphic user interface may prompt the user to capture the remaining un-captured raw images.

In practice, the sequence and method of capturing the target images are not restricted. In an embodiment, after the target images beside the boundaries of the designated shooting area $R_{select}$ are captured, the remaining target images within these boundary target images will be captured. In some other embodiments, after the boundaries of the designated shooting area $R_{select}$ are defined with a specified function key by rotating the photographing device, the target images within the designated shooting area $R_{select}$ will be captured. Moreover, it is noted that the designated shooting area $R_{select}$ is not restricted to have the rectangular shape.

It is noted that the target images may be manually or automatically captured by the photographing device 20. In an embodiment, the target image is captured by the photographing device 20 after the user confirms that the actual focal position is appropriate. In some other embodiments, during the process of rotating the photographing device 20, if the actual focal position is aligned with the designated focal position, the target image is automatically captured by the photographing device 20.

From the above descriptions, the present disclosure provides a panorama photographing method. According to the panorama photographing method of the present disclosure, the designated shooting area $R_{select}$ may be determined according to the user's requirements. Moreover, the photographing device has the function of automatically capturing the target images. Moreover, the boundaries of the designated shooting area $R_{select}$ may be defined by the user. Consequently, the size of the designated shooting area $R_{select}$ can be dynamically adjusted. In other words, the panorama photographing method of the present disclosure is more user-friendly.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A panorama photographing method, comprising:
   defining a plurality of panorama focal positions required for a full panorama image;
   determining a designated shooting area, wherein the panorama focal positions within the designated shooting area are taken as a plurality of designated focal positions;
   capturing a plurality of target images corresponding to the plurality of designated focal positions; and
   generating a partial panoramic image corresponding to the designated shooting area according to the plurality of target images.

2. The panorama photographing method according to claim 1, wherein a shooting area corresponding to the full panoramic image is larger than the designated shooting area.

3. The panorama photographing method according to claim 1, wherein the step of determining the designated shooting area comprises:
   defining a first boundary of the designated shooting area along a first direction; and
   defining a second boundary of the designated shooting area along a second direction different than the first direction.

4. The panorama photographing method according to claim 3, wherein
   the first direction is a horizontal direction, and a width of the designated shooting area is equal to a length of the first boundary, and
   the second direction is a vertical direction, and a height of the designated shooting area is equal to a length of the second boundary.

5. The panorama photographing method according to claim 3, wherein the step of determining the designated shooting area further comprises:
   defining a third boundary in parallel with the first boundary; and
   defining a fourth boundary in parallel with the second boundary, wherein the designated shooting area is defined by the first boundary, the second boundary, the third boundary and the fourth boundary.

6. The panorama photographing method according to claim 3, wherein the first boundary and the second boundary are perpendicular to each other, and the designated shooting area is rectangular.

7. The panorama photographing method according to claim 1, wherein
   the first direction is a vertical direction, and a height of the designated shooting area is equal to a length of the first boundary; and
   the second direction is a horizontal direction, and a width of the designated shooting area is equal to a length of the second boundary.

8. The panorama photographing method according to claim 1, wherein the designated shooting area is determined by sensing a rotating trajectory of an electronic device.

9. The panorama photographing method according to claim 8, wherein
   a length of the first boundary of the designated shooting area is determined according to a rotating extent of the electronic device along the first direction and a focusing distance of the electronic device; and
   a length of the second boundary of the designated shooting area is determined according to a rotating extent of the electronic device along the second direction and the focusing distance of the electronic device.

10. The panorama photographing method according to claim 9, wherein the focusing distance is a relative distance between the electronic device and an actual focal position of the electronic device.

11. The panorama photographing method according to claim 8, wherein the step of capturing the plurality of target images corresponding to the plurality of designated focal positions comprises:
    displaying a preview screen on the electronic device, wherein a content of the preview screen is changed in response to rotation of the electronic device.

12. The panorama photographing method according to claim 11, wherein the preview screen shows an image corresponding to a capturing range of the electronic device, wherein the capturing range is smaller than the designated shooting area.

13. The panorama photographing method according to claim 12, wherein the step of capturing the plurality of target images corresponding to the plurality of designated focal positions further comprises:
    when the capturing range is within the designated shooting area, showing the image of the capturing range on the preview screen in a first display mode; and
    when the capturing range is beyond the designated shooting area, showing the image of the capturing range on the preview screen in a second display mode.

14. The panorama photographing method according to claim 13, wherein the step of capturing the plurality of target images corresponding to the plurality of designated focal positions further comprises:

when a first portion of the capturing range is within the designated shooting area and a second portion of the capturing range is beyond the designated shooting area, showing the first portion of the capturing range on the preview screen in the first display mode and showing the second portion of the capturing range on the preview screen in the second display mode.

15. The panorama photographing method according to claim 11, wherein the step of capturing the plurality of target images corresponding to the plurality of designated focal positions further comprises:

when an actual focal position of the electronic device is aligned with one of the plurality of designated focal positions, capturing the preview screen corresponding to the actual focal position accordingly as the target image.

16. The panorama photographing method according to claim 15, wherein the preview screen shows a plurality of target patterns corresponding to the plurality of designated focal positions.

17. The panorama photographing method according to claim 16, wherein the preview screen further shows a focusing frame that represents the actual focal position.

18. The panorama photographing method according to claim 17, wherein when one of the plurality of target patterns is circumscribed by the focusing frame, the actual focal position of the electronic device is aligned with the designated focal position corresponding to the circumscribed target pattern.

19. The panorama photographing method according to claim 15, wherein the step of capturing the plurality of target images corresponding to the plurality of designated focal positions further comprises when the actual focal position is beyond the designated shooting area, stopping capturing the preview screen.

* * * * *